(12) United States Patent
Hiekata et al.

(10) Patent No.: US 10,949,391 B2
(45) Date of Patent: Mar. 16, 2021

(54) AUTOMATICALLY IDENTIFYING SOURCE CODE RELEVANT TO A TASK

(71) Applicant: International Business Machines Corporation, Armonk, NY (US)

(72) Inventors: Maki Hiekata, Tokyo (JP); Mihoko Hasegawa, Tokyo (JP); Kensuke Matsuoka, Tokyo (JP); Duc Binh Bui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 16/117,313

(22) Filed: Aug. 30, 2018

(65) Prior Publication Data

US 2020/0073960 A1 Mar. 5, 2020

(51) Int. Cl.
*G06F 17/30* (2006.01)
*G06F 16/14* (2019.01)
*G06F 8/70* (2018.01)
*G06F 16/9535* (2019.01)
*G06F 16/2457* (2019.01)

(52) U.S. Cl.
CPC .............. *G06F 16/148* (2019.01); *G06F 8/70* (2013.01); *G06F 16/156* (2019.01); *G06F 16/24578* (2019.01); *G06F 16/9535* (2019.01)

(58) Field of Classification Search
CPC .. G06F 16/3344; G06F 16/325; G06F 16/338; G06F 16/334; G06F 16/951; G06F 16/2455
See application file for complete search history.

(56) References Cited

U.S. PATENT DOCUMENTS

| | | | |
|---|---|---|---|
| 5,630,117 A * | 5/1997 | Oren | G06F 16/954 |
| 5,983,277 A | 11/1999 | Heile et al. | |
| 6,374,241 B1 * | 4/2002 | Lamburt | G06F 16/954 |
| 6,507,839 B1 * | 1/2003 | Ponte | G06F 16/9535 |
| 27,506,362 | 9/2007 | Horn | |

(Continued)

OTHER PUBLICATIONS

Saha, Ripon K. et al., "Improving Bug Localization using Structured Information Retrieval", The 28th IEEE/ACM International Conference on Automated Software Engineering, Palo Alto, California from Nov. 11-15, 2013, 11 pages.

*Primary Examiner* — Daniel A Kuddus
(74) *Attorney, Agent, or Firm* — Francis Lammes; Alexander Jochym; Stephen J. Walder, Jr.

(57) ABSTRACT

Mechanisms are provided to automatically identify source code relevant to a task among a set of disparate source code. The mechanisms search a plurality of working sets based on a given keyword associated with the task in order to identify a subset of working sets from a working set store that comprises the given keyword. The mechanisms identify source code files associated with the identified working sets. The mechanisms determine a score that depends on the occurrences of matched working sets for the given keyword within each identified source code file. For each directory or repository, the mechanisms determine an aggregated score for all the source code files comprised therein. The mechanisms present a listing of all identified source code files by directory and repository, where the listing illustrates a relevancy of repositories, directories, and source code files that comprise the given keyword associated with the task.

17 Claims, 4 Drawing Sheets

(56) References Cited

U.S. PATENT DOCUMENTS

| | | | |
|---|---|---|---|
| 7,283,997 B1* | 10/2007 | Howard, Jr. | G06F 16/337 |
| 7,725,424 B1* | 5/2010 | Ponte | G06F 16/9535 |
| | | | 707/715 |
| 7,801,896 B2* | 9/2010 | Szabo | G06F 21/6245 |
| | | | 707/739 |
| 8,095,533 B1* | 1/2012 | Ponte | G06F 16/9535 |
| | | | 707/715 |
| 8,171,031 B2* | 5/2012 | Tankovich | G06F 16/951 |
| | | | 707/741 |
| 8,370,362 B2* | 2/2013 | Szabo | G06F 21/6245 |
| | | | 707/739 |
| 8,499,280 B2 | 7/2013 | Davies et al. | |
| 8,688,676 B2* | 4/2014 | Rush | G06F 8/36 |
| | | | 707/706 |
| 9,280,595 B2* | 3/2016 | Edwards | G06F 16/316 |
| 9,348,894 B2 | 5/2016 | Asadullah et al. | |
| 9,684,584 B2 | 6/2017 | Bates et al. | |
| 2006/0286540 A1* | 12/2006 | Burstein | G06F 40/20 |
| | | | 434/353 |
| 2007/0156677 A1* | 7/2007 | Szabo | G06F 16/2457 |
| 2009/0292677 A1* | 11/2009 | Kim | G06F 16/958 |
| 2010/0106705 A1* | 4/2010 | Rush | G06F 8/36 |
| | | | 707/709 |
| 2010/0332583 A1* | 12/2010 | Szabo | G06F 16/248 |
| | | | 709/202 |
| 2012/0284253 A9* | 11/2012 | Ghosh | G06F 16/242 |
| | | | 707/711 |
| 2013/0179863 A1 | 7/2013 | Vangala et al. | |
| 2014/0136532 A1* | 5/2014 | Ponte | G06F 16/951 |
| | | | 707/730 |
| 2016/0171091 A1* | 6/2016 | Edwards | G06F 16/24578 |
| | | | 707/750 |
| 2016/0188440 A1* | 6/2016 | Bates | G06F 11/3624 |
| | | | 717/129 |
| 2016/0378769 A1* | 12/2016 | Hopcroft | G06F 16/316 |
| | | | 707/730 |
| 2016/0378806 A1* | 12/2016 | Hopcroft | G06F 16/93 |
| | | | 707/715 |
| 2016/0378807 A1* | 12/2016 | Hopcroft | G06F 16/93 |
| | | | 707/715 |
| 2018/0293304 A1* | 10/2018 | Miller | G06F 16/335 |
| 2018/0293327 A1* | 10/2018 | Miller | G06F 16/26 |

* cited by examiner

AUTOMATICALLY IDENTIFYING SOURCE CODE RELEVANT TO A TASK

BACKGROUND

The present application relates generally to an improved data processing apparatus and method and more specifically to mechanisms for automatically identifying source code relevant to a task among a set of disparate source code.

In computing, source code is any collection of code, possibly with comments, written using a human-readable programming language, usually as plain text. The source code of a program is specially designed to facilitate the work of computer programmers, who specify the actions to be performed by a computer mostly by writing source code. Source code may often be comprised of a number of modules, each module emphasizing a separate functionality of the larger program. That is, the program comprises independent, interchangeable modules, such that each module comprises everything necessary to execute only one aspect of the desired functionality of the program. The resulting source code is then often transformed by an assembler or compiler into binary machine code understood by the computer. The machine code might then be stored for execution at a later time. Alternatively, source code may be interpreted and thus immediately executed.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions that are executed by the processor to configure the processor to implement a source code specific identification mechanism to automatically identify source code relevant to a task among a set of disparate source code. The method comprises searching, by a search engine in the source code specific identification mechanism, a plurality of working sets based on a given keyword associated with the task in order to identify a subset of working sets from a working set store that comprises the given keyword. The method also comprises identifying, by the search engine, source code files associated with the identified working sets. Moreover, the method comprises determining, by a scoring engine in the source code specific identification mechanism, a score that depends on the occurrences of matched working sets for the given keyword within each identified source code file, the score weighted by working set type. Additionally, the method comprises, for each directory or repository, determining, by the scoring engine, an aggregated score for all the source code files comprised therein. The method further comprises presenting, by a presentation engine, a listing of all identified source code files by directory and repository, wherein the listing illustrates a relevancy of repositories, directories, and source code files that comprise the given keyword associated with the task.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
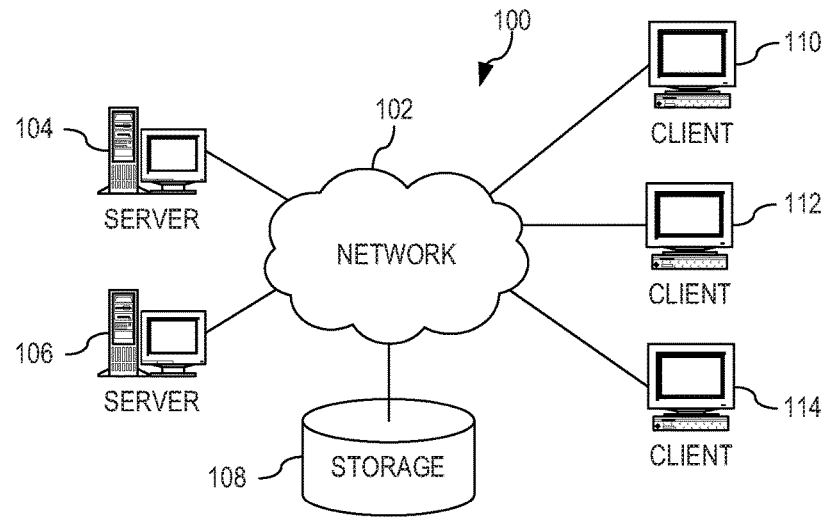
FIG. 1 is an example diagram of a distributed data processing system in which aspects of the illustrative embodiments may be implemented.

As noted previously, source code of a program may often be comprised of a number of modules, each module emphasizing a separate functionality of the larger program. That is, the program comprises independent, interchangeable modules, such that each module comprises everything necessary to execute only one aspect of the desired functionality of the program. The resulting source code is then often transformed by an assembler or compiler into binary machine code understood by the computer. The machine code might then be stored for execution at a later time. Alternatively, source code may be interpreted and thus immediately executed.

In addition to storing the machine code, the program as well as the individual modules that make up the program may be stored for later access. Over time, each program may be maintained for proper execution, enhanced to provide added benefit, or the like, with each maintenance, enhancement, or the like, resulting in a new program and/or set of modules, hereinafter referred to as source code files, being stored for later access. The storage of the creation, maintenance, enhancement, or the like, of each source code file results in a large set of source code files, some of which may no longer be used; some of which have similar names of classes, methods, variable, or the like; as well as some of which have a variety of programming languages, file types, or the like. Further, with the storage of the large set of source code files, many of the original authors of particular source code files may have left the enterprise for which the source code file was created as well as documentation associated with each piece of source code file may be out of date, missing, or ambiguous.

Thus, when a computer programmer is looking for source code relevant to a particular task among all of the source code in the large set of source code files, the computer programmer may encounter difficulty in identifying the particular source code file truly related to the particular task due to multiple source code packages; multiple source code repositories; out-of-date, missing, or ambiguous documentation; missing source code for compiled code; or the like. Current solutions for identifying source code relevant to a particular task is to run a text search, which results in numerous results that each have to be manually checked using only hints of names, repositories, package structures, or the like, which requires experienced computer programmers using their instinct to identify the particular source code file.

Therefore, the illustrative embodiments provide mechanisms for automatically identifying source code relevant to a task among a set of disparate source code. Analyzing a set of source code repositories, the source code specific identification mechanism groups source code files in the set of source code repositories into a plurality of working sets. Using external augmentation information, such as a computer programmer's work history, execution history, or the like, the source code specific identification mechanism analyzes each source code file in the set of source code repositories to generate a plurality of working sets based on type, such as, for example, source code files committed at or around a same time, source code files referenced at or around a same time, source code files edited at or around a same time, debug information associated with committed or edited source code files, files processed when executed by a specific function within the source code files. The files processed when executed by the specific function within the source code files may be identified using execution logs, results of debugger, profilers at runtime, or the like. Source code files referenced at or around a same time may be identified by tabs opened in source code editors, integrated development environments (IDEs), web browsers, or the like; activities performed on files, such as edit, save, view, or the like; breakpoints set/stopped in one or more execution steps, or the like. With the plurality of working sets generated based on type, the source code specific identification mechanism associates keywords with each working set in the plurality of working sets. The source code specific identification mechanism extracts the keywords from, for example, the source code files within the working set, such as class name, method name, error code, or the like; messages in log files associated with the source code files within the working set; commit comments and related discussions in task management systems associated with the source code files within the working set; or the like, to form a set of keywords specific to each working set in the plurality of working sets, which the source code specific identification mechanism stores in a working set store.

Using the working sets (i.e., for example, commit & task, edit & debug, execution, etc.) and a given keyword provided by the computer programmer who is searching for source code relevant to a particular task among all of the source code in the set of source code repositories, the source code specific identification mechanism identifies working sets from a working set store that comprise the given keyword. That is, in order to expedite identification of files that comprises the given keyword, the source code specific identification mechanism identifies working sets comprising the given keyword from one or more working sets in the plurality of working sets in the working set store. The source code specific identification mechanism then identifies specific source code files associated with the identified working sets. So as to provide more detail to the computer programmer, the source code specific identification mechanism also identifies computer code lines within the identified source code files.

More specifically, the source code specific identification mechanism determines a score that depends on the occurrences of matched working set for the given keyword, the score weighted by working set type. That is, for each working set type, the source code specific identification mechanism generates a score that depends on a weighted count of a working set type comprised within each file. To generate the score, the source code specific identification mechanism identifies the occurrences of each working set type within the file. The source code specific identification mechanism counts the working set types (i.e., for example, commit & task, edit & debug, execution, etc.) within each file of the identified working sets. For example, if a particular file comprises 6 occurrences of a commit & task working set type, the source code specific identification mechanism multiplies the count of 6 by a predetermined weight value, for example 1.2, and generates a commit & task score of 7.2. As another example, if the same particular file comprises 8 occurrences of a edit & debug working set type, the source code specific identification mechanism multiplies the count of 8 by a predetermined weight value, for example 0.9, and generates a edit & debug score of 7.2. As a further example, if the same particular file comprises 1 occurrence of an execution working set type, the source code specific identification mechanism multiplies the count of 1 by a predetermined weight value, for example 1.4, and generates an execution score of 1.4. The weight associated with each working set type may be an initial predetermined value, which may later be adjusted by the computer programmer. The source code specific identification mechanism then calculates a total score for the particular file by summing the determined working set type scores. Thus, for the above example, the total score would be 15.8.

The source code specific identification mechanism then determines an aggregate score for each identified directory and repository based on the scores calculated for each file within the particular directory or repository. That is, simply summing the scores for each identified files may cause a directory or repository with several low total score files to have a higher overall score than a directory or repository with a few high total score files. Therefore, the source code specific identification mechanism performs a weighted calculation of the total scores for each identified file in a particular directory or repository that provides a statistical tolerance analysis of the weighted scores. For example, if a particular directory or repository has files with total scores of 15 and 13, then the source code specific identification mechanism determines an aggregated score using the following equation:

$$\sqrt{score1*score1+score2*score2+\ldots+score(n)*score(n)}.$$

Thus, for total scores of 15 and 13, the weighted calculation would be 20.

The source code specific identification mechanism then presents, via a user interface, the identified source code files grouped by directory and repository to the computer programmer. For each particular source code file, each particular directory, and of each particular repository, the source code specific identification mechanism presents a related score, where the score associated with the source code file is a sum of the working set type scores associated with the working set types identified within the source code file and the score associated with the directory and repository being an aggregate of the total scores associated with the files within the directory or repository. The source code specific identification mechanism provides differentiation through the user of colors associated with the source code file names directories, and repositories to indicate the importance of the corresponding working set types based on the score. As an additional benefit to the computer programmer, for each line of code in each source code file, the source code specific identification mechanism may provide an indication through, for example, highlighting, bolding, or the like, the likes of code related to the working set type. Thus, the illustrative embodiments provide mechanisms for automatically identifying source code relevant to a task among a set of disparate source code.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
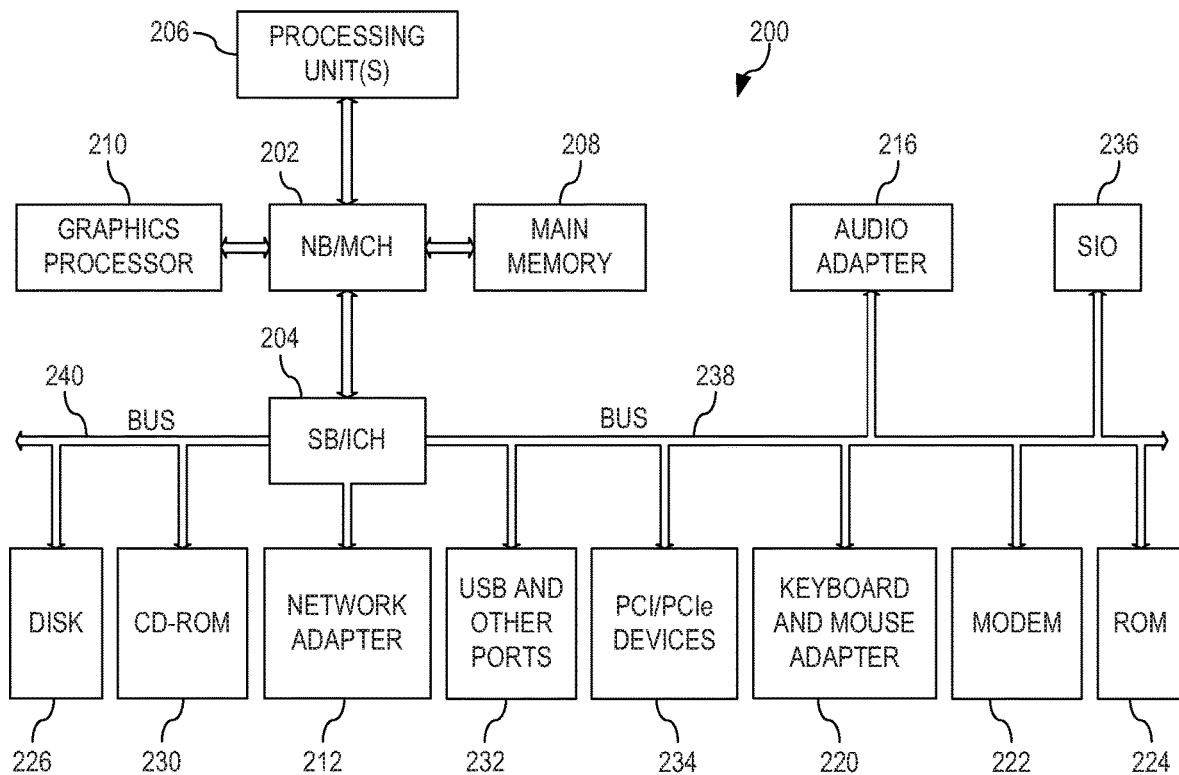
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a source code specific identification mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automatically identifying source code relevant to a task among a set of disparate source code.

As noted above, the mechanisms of the illustrative embodiments utilize specifically configured computing devices, or data processing systems, to perform the operations for automatically identifying source code relevant to a task among a set of disparate source code. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the automatic identification of source code relevant to a task among a set of disparate source code.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
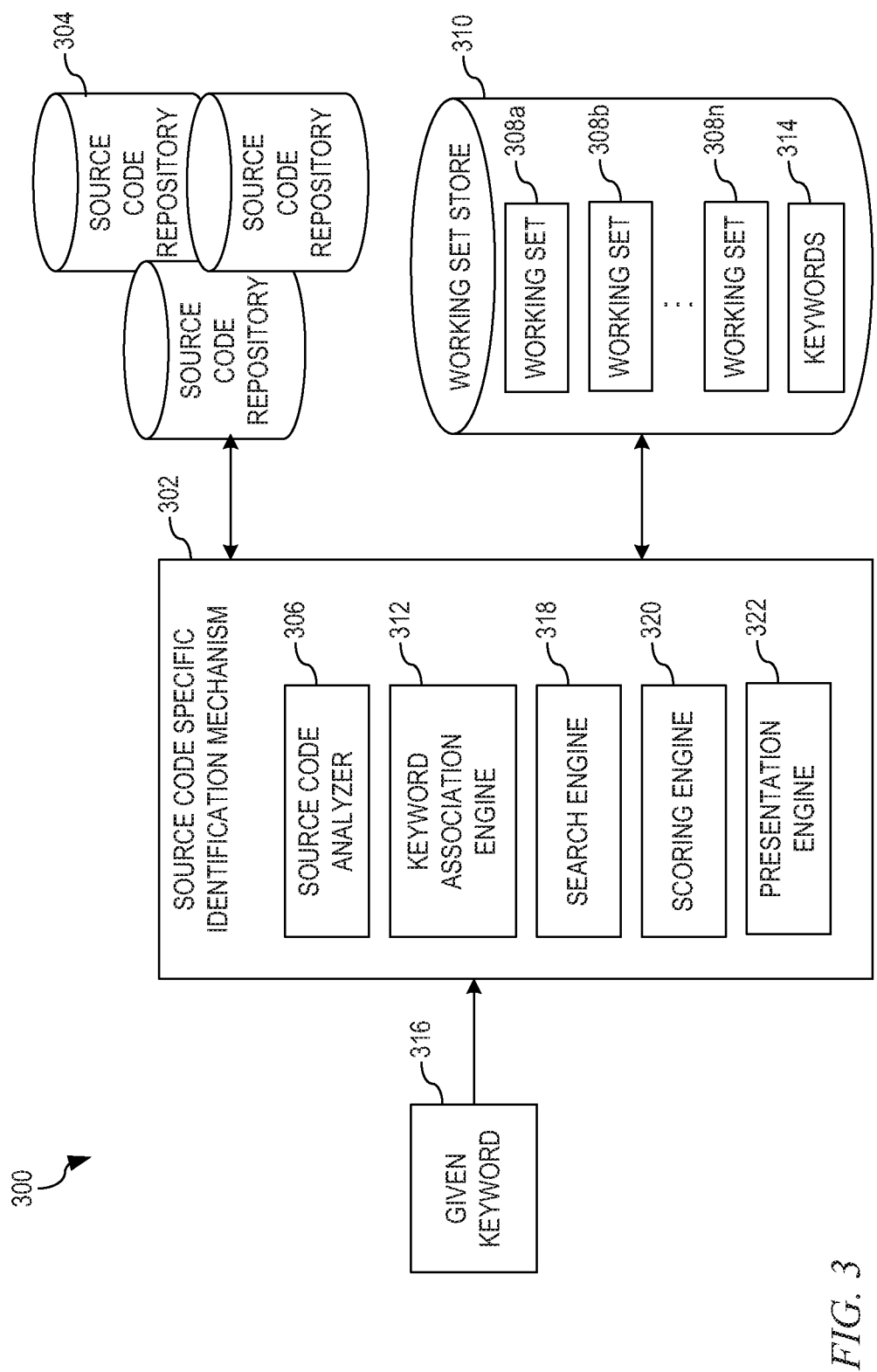
FIG. 3 depicts an exemplary functional block diagram of a data processing system that automatically identifies source code relevant to a task among a set of disparate source code in accordance with an illustrative embodiment.

FIG. 3 depicts an exemplary functional block diagram of a data processing system that automatically identifies source code relevant to a task among a set of disparate source code in accordance with an illustrative embodiment. Data processing system 300 comprises source code specific identification mechanism 302 and a set of source code repositories 304. Source code specific identification mechanism 302 comprises source code analyzer 306, keyword association engine 312, search engine 318, scoring engine 320, and presentation engine 322. Initially, source code analyzer 306 analyzes each source code file in each source code repository of the set of source code repositories 304 in order to group the source code files into a plurality of working sets. Using external augmentation information, such as a computer programmer's work history, execution history, or the like, source code analyzer 306 analyzes each source code file in the set of source code repositories 304 to generate a plurality of working sets 308a, 308b, . . . 308n in working set store 310 based on type, such as, for example, source code files committed at or around a same time, source code files referenced at or around a same time, source code files edited at or around a same time, debug information associated with committed or edited source code files, files processed when executed by a specific function within the source code files. With the plurality of working sets generated based on type, keyword association engine 312 associates keywords with each working set in the plurality of working sets 308a-308n. Keyword association engine 312 extracts the keywords from, for example, the source code files within the working set, such as class name, method name, error code, or the like; messages in log files associated with the source code files within the working set; commit comments and related discussions in task management systems associated with the source code files within the working set; or the like to form a set of keywords 314 specific to each working set in the plurality of working sets 308a-308n.

When a computer programmer provides a given keyword 316 for source code relevant to a particular task, search engine 318 searches the plurality of working sets 308a-308n based on the given keyword 316 in order to identify working sets from working set store 310 that comprise the given keyword 316. That is, in order to expedite identification of source code files that comprises the given keyword search engine 318 identifies on or more working sets within the plurality of working sets 308a-308n comprising the given keyword 316. Search engine 318 then identifies specific source code files associated with the identified working sets. So as to provide more detail to the computer programmer, search engine 318 also identifies computer code lines within each of the identified source code files.

More specifically, scoring engine 320 determines a score that depends on the occurrences of matched working sets for the given keyword within each identified source code file, the score weighted by working set type. That is, for each working set type, scoring engine 320 generates a score that depends on a weighted count of a working set type comprised within each source code file. To generate the score, scoring engine 320 identifies the occurrences of each working set type within the source code file. Scoring engine 320 counts the working set types (i.e., for example, commit & task, edit & debug, execution, etc.) within each source code file of the identified working sets. For example, if a particular source code file comprises 6 occurrences of a commit & task working set type, scoring engine 320 multiplies the count of 6 by a predetermined weight value, for example 1.2, and generates a commit & task score of 7.2. As another example, if the same particular source code file comprises 8 occurrences of a edit & debug working set type, scoring engine 320 multiplies the count of 8 by a predetermined weight value, for example 0.9, and generates a edit & debug score of 7.2. As a further example, if the same particular source code file comprises 1 occurrence of an execution working set type, scoring engine 320 multiplies the count of 1 by a predetermined weight value, for example 1.4, and generates an execution score of 1.4. The weight associated with each working set type may be an initial predetermined value, which may later be adjusted by the computer programmer. Scoring engine 320 then calculates a total score for the particular source code file by summing the determined working set type scores. Thus, for the above example, the total score would be 15.8.

Scoring engine 320 then determines an aggregate score for each identified directory and repository based on the scores calculated for each source code file within the particular directory or repository. That is, simply summing the scores for each identified file may cause a directory or repository with several low total score source code files to have a higher overall score than a directory or repository with a few high total score source code files. Therefore, scoring engine 320 performs a weighted calculation of the total scores for each identified source code file in a particular directory or repository that provides a statistical tolerance analysis of the weighted scores. For example, if a particular directory or repository has source code files with total scores of 15 and 13, then the source code specific identification mechanism determines an aggregated score using the following equation:

$$\mathrm{sqrt}(\mathrm{score1}*\mathrm{score1}+\mathrm{score2}*\mathrm{score2}+\ldots+\mathrm{score}(n)*\mathrm{score}(n)).$$

Thus, for total scores of 15 and 13, scoring engine 320 would determine the weighted calculation to be 20.

Presentation engine 322 then presents, via a user interface, the identified source code files grouped by directory and repository to the computer programmer. For each particular source code file, presentation engine 322 presents a related score, where the score associated with the source code file is a sum of the working set type scores associated with the working set types identified within the source code file and the score associated with each directory and repository being an aggregate of the total scores associated with the source code files within the directory or repository. Presentation engine 322 provides differentiation through the user of colors associated with the source code file names, directories, and repositories to indicate the importance of the corresponding working set types based on the score. As an additional benefit to the computer programmer, for each line of code in each source code file, presentation engine 322 may provide an indication through, for example, highlighting, bolding, or the like, the likes of code related to the working set type.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
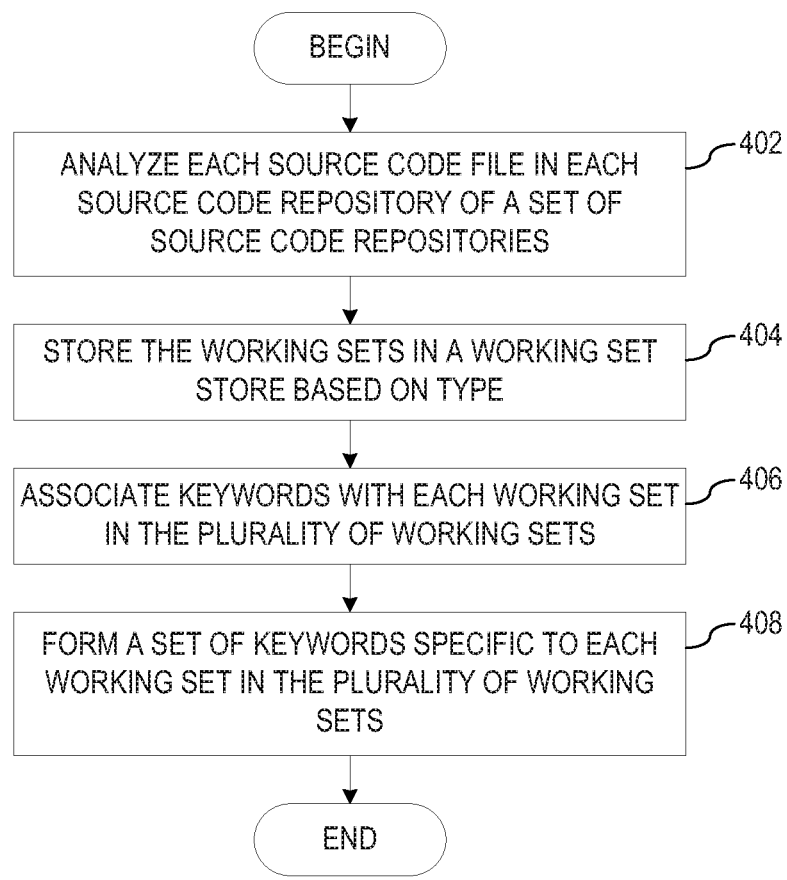
FIG. 4 depicts an exemplary flow diagram of the operation performed by a source code specific identification mechanism in generating a plurality of working sets and keywords for source code files in each source code repository of a set of source code repositories in accordance with an illustrative embodiment.

FIG. 4 depicts an exemplary flow diagram of the operation performed by a source code specific identification mechanism in generating a plurality of working sets and keywords for source code files in each source code repository of a set of source code repositories in accordance with an illustrative embodiment. As the operation begins, the source code specific identification mechanism analyzes each source code file in each source code repository of a set of source code repositories (step 402) in order to group the source code files into a plurality of working sets. More specifically, using external augmentation information, such as a computer programmer's work history, execution history, or the like, the source code specific identification mechanism analyzes each source code file in the set of source code repositories to generate a plurality of working sets, which the source code specific identification mechanism then stores in working set store based on type (step 404), such as, for example, source code files committed at or around a same time, source code files referenced at or around a same time, source code files edited at or around a same time, debug information associated with committed or edited source code files, files processed when executed by a specific function within the source code files. With the plurality of working sets generated based on type, the source code specific identification mechanism associates keywords with each working set in the plurality of working sets (step 406). The source code specific identification mechanism extracts the keywords from, for example, the source code files within the working set, such as class name, method name, error code, or the like; messages in log files associated with the source code files within the working set; commit comments and related discussions in task management systems associated with the source code files within the working set; or the like, in order to form a set of keywords specific to each working set in the plurality of working sets (step 408), with the operation ending thereafter.

Figure 5:
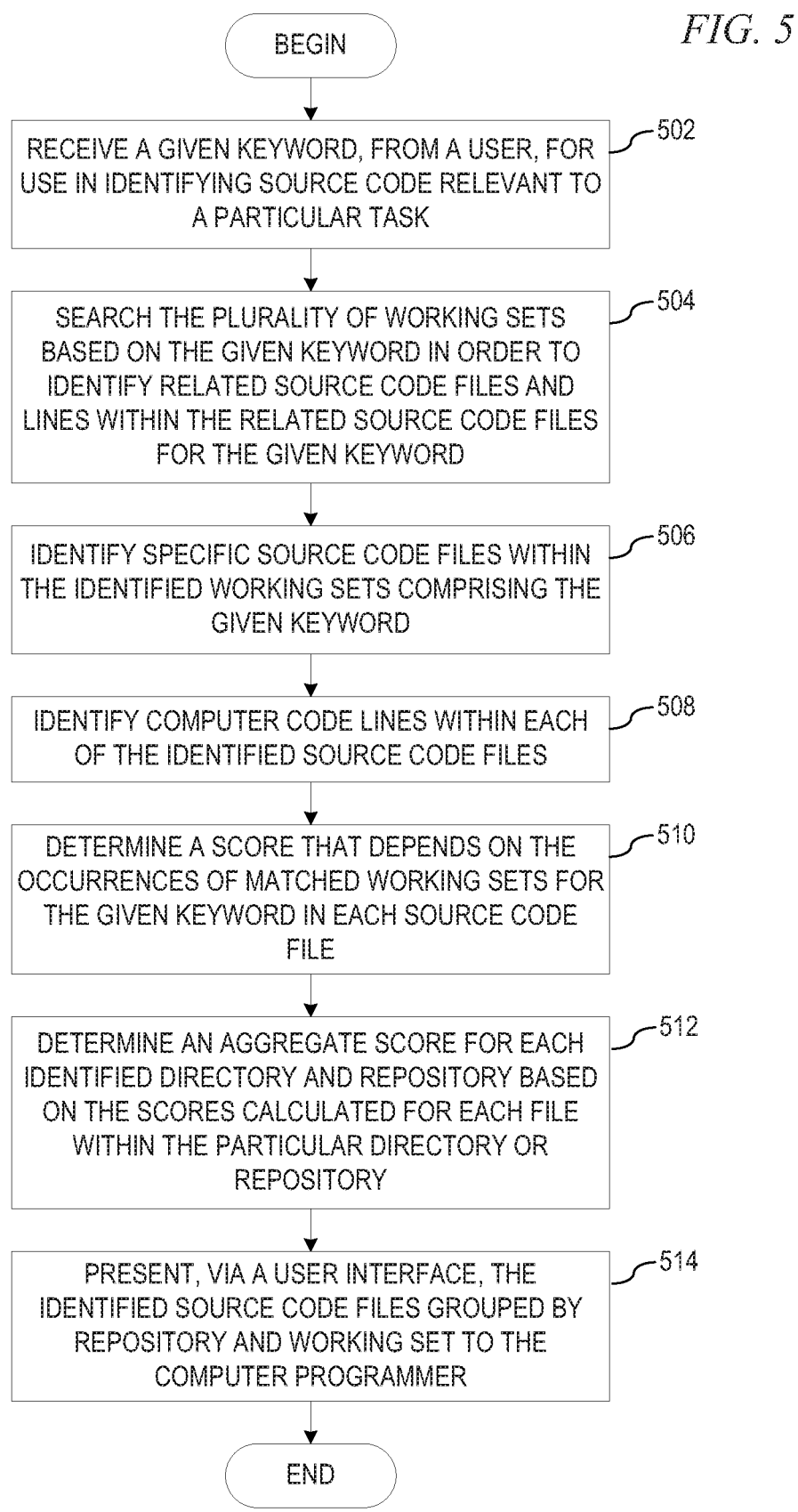
FIG. 5 depicts an exemplary flow diagram of the operation performed by a source code specific identification mechanism in automatically identifying source code relevant to a task among a set of disparate source code in accordance with an illustrative embodiment.

FIG. 5 depicts an exemplary flow diagram of the operation performed by a source code specific identification mechanism in automatically identifying source code relevant to a task among a set of disparate source code in accordance with an illustrative embodiment. As the operation begins, the source code specific identification mechanism receives a given keyword, from a user, for use in identifying source code relevant to a particular task (step 502). The source code specific identification mechanism searches the plurality of working sets based on the given keyword in order to identify working sets from working set store 310 that comprise the given keyword 316 (step 504). The source code specific identification mechanism then identifies specific source code files associated with the identified working sets (step 506) and then the source code specific identification mechanism identifies computer code lines within each of the identified source code files (step 508).

The source code specific identification mechanism determines a score that depends on the occurrences of matched working sets for the given keyword within each source code file (step 510). That is, for each working set type, the source code specific identification mechanism generates a score that depends on a weighted count of a working set type comprised within each source code file. Thus, the source code specific identification mechanism weights the score based on a working set type. The weight associated with each working set type may be an initial predetermined value, which may later be adjusted by the computer programmer. The source code specific identification mechanism then determines an aggregate score for each identified directory and repository based on the scores calculated for each source code file within the particular directory or repository (step 512). That is, simply summing the scores for each identified source code file may cause a directory or repository with several low total score source code files to have a higher overall score than a directory or repository with a few high total score source code files. Therefore, the source code specific identification mechanism performs a weighted calculation of the total scores for each identified source code file in a particular directory or repository that provides a statistical tolerance analysis of the weighted scores.

The source code specific identification mechanism then presents, via a user interface, the identified source code files grouped by directory and repository to the computer programmer (step 514). For each particular source code file, the source code specific identification mechanism presents a related score, where the score associated with the source code file is a sum of the scores associated with the working set types within the source code file and the score associated with each directory and repository being an aggregate of the total scores associated with the source code files within the directory or repository. The source code specific identification mechanism provides differentiation through the user of colors associated with the source code file names, directories, and repositories to indicate the importance of the corresponding working set types based on the score. As an additional benefit to the computer programmer, for each line of code in each source code file, the source code specific identification mechanism may provide an indication through, for example, highlighting, bolding, or the like, the likes of code related to the working set type. The operation ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for automatically identifying source code relevant to a task among a set of disparate source code. The mechanisms analyze each source code file in the set of source code repositories to generate a plurality of working sets based on type. With the plurality of working sets generated based on type, mechanisms associate keywords with each working set in the plurality of working sets. Using the working sets and a given keyword, the mechanism identify one or more working sets comprising the given keyword, specific source code files within the identified working sets comprising the given keyword, and computer code lines within the identified source code files comprising the given keyword. The mechanisms determine a score that depends on the occurrences in matched working sets. The mechanisms weight the score and then perform a root-sum-square of the weighted scores. The mechanisms then presents, via a user interface, the identified source code files grouped by repository and working set to the computer programmer. Thus, the illustrative embodiments provide mechanisms for automatically identifying source code relevant to a task among a set of disparate source code.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the at least one processor to cause the at least one processor to be configured to implement a source code identification mechanism to automatically identify source code relevant to a task among a set of disparate source code, the method comprising:

searching, by a search engine in the source code identification mechanism, a plurality of working sets based on a keyword associated with the task to identify a subset of working sets from a working set store that comprises the keyword associated with the task, wherein each working set in the plurality of working sets is grouped based on a working set type and wherein the working set type is at least one of commit & task, edit & debug, or execution;

identifying, by the search engine, source code files associated with the identified working sets;

determining, by a scoring engine in the source code identification mechanism, a score that depends on the occurrences of matched working sets for the keyword within each identified source code file, wherein determining the score that depends on the occurrences of matched working sets for the keyword within each identified source code file further comprises:

for each identified source code file, multiplying, by the scoring engine, each identified working set type identified within the source code file by a predetermined value; and summing, by the scoring engine, the scores of each working set type identified within the source code file to generate the score for the source code file;

for each directory or repository, determining, by the scoring engine, an aggregated score for all the source code files comprised within; and presenting, by a presentation engine, a listing of all identified source code files by directory and repository, wherein the listing illustrates a relevancy of repositories, directories, and source code files that comprise the keyword associated with the task.

2. The method of claim 1, wherein the relevancy is based on the determined score for the source code file and the aggregated score for the directory or repository.

3. The method of claim 1, wherein the presentation uses an indication of relevancy when presenting the repositories, directories, and source code files.

4. The method of claim 3, wherein the indication of relevancy is the determined score or determined aggregated score or is a color difference.

5. The method of claim 1, wherein determining the aggregated score for all the source code files comprised within a particular directory or a particular repository, comprises:

computing, by the scoring engine, the aggregated score using the following equation:

$$\mathrm{sqrt}(score1*score1+score2*score2+\ldots+score(n)*score(n))$$

wherein score1, score2, . . . , score (n) are the scores associated with the source code files comprised within the particular directory or repository.

6. The method of claim 1, further comprising:

identifying, by the search engine, computer code lines within each of the identified source code files associated with the matched working set types; and presenting, by the presentation engine, an indication of the computer code lines within each of the identified source code files associated with the matched working set types responsive to a particular source code file in the listing of all identified source code files being selected.

7. A computer program product comprising a non-transitory computer readable storage medium having a computer readable program stored within, wherein the computer readable program, when executed on a data processing system, causes the data processing system to implement a source code identification mechanism to automatically identify source code relevant to a task among a set of disparate source code, and further causes the data processing system to:

search, by a search engine in the source code identification mechanism, a plurality of working sets based on a keyword associated with the task to identify a subset of working sets from a working set store that comprises the keyword associated with the task, wherein each working set in the plurality of working sets is grouped based on a working set type and wherein the working set type is at least one of commit & task, edit & debug, or execution;

identify, by the search engine, source code files associated with the identified working sets;

determine, by a scoring engine in the source code identification mechanism, a score that depends on the occurrences of matched working sets for the keyword within each identified source code file, wherein the computer readable program to determine the score that depends on the occurrences of matched working sets for the keyword within each identified source code file further causes the data processing system to:

for each identified source code file, multiply, by the scoring engine, each identified working set type identified within the source code file by a predetermined value; and sum, by the scoring engine, the scores of each working set type identified within the source code file to generate the score for the source code file;

for each directory or repository, determine, by the scoring engine, an aggregated score for all the source code files comprised within; and present, by a presentation engine, a listing of all identified source code files by directory and repository, wherein the listing illustrates a relevancy of repositories, directories, and source code files that comprise the keyword associated with the task.

8. The computer program product of claim 7, wherein the relevancy is based on the determined score for the source code file and the aggregated score for the directory or repository.

9. The computer program product of claim 7, wherein the presentation uses an indication of relevancy when presenting the repositories, directories, and source code files.

10. The computer program product of claim 9, wherein the indication of relevancy is the determined score or determined aggregated score or is a color difference.

11. The computer program product of claim 7, wherein the computer readable program to determine the aggregated score for all the source code files comprised within a particular directory or a particular repository further causes the data processing system to:

compute, by the scoring engine, the aggregated score using the following equation:

$$\sqrt{score1*score1+score2*score2+\ldots+score(n)*score(n)}$$

wherein score1, score2, ..., score (n) are the scores associated with the source code files comprised within the particular directory or repository.

12. The computer program product of claim 7, wherein the computer readable program further causes the data processing system to:

identify, by the search engine, computer code lines within each of the identified source code files associated with the matched working set types; and present, by the presentation engine, an indication of the computer code lines within each of the identified source code files associated with matched working set types responsive to a particular source code file in the listing of all identified source code files being selected.

13. A data processing system comprising:

at least one processor; and at least one memory coupled to the at least one processor, wherein the at least one memory comprises instructions which, when executed by the at least one processor, cause the at least one processor to implement a source code identification mechanism to automatically identify source code relevant to a task among a set of disparate source code, and further cause the at least one processor to:

search, by a search engine in the source code identification mechanism, a plurality of working sets based on a keyword associated with the task to identify a subset of working sets from a working set store that comprises the keyword associated with the task, wherein each working set in the plurality of working sets is grouped based on a working set type and wherein the working set type is at least one of commit & task, edit & debug, or execution;

identify, by the search engine, source code files associated with the identified working sets;

determine, by a scoring engine in the source code identification mechanism, a score that depends on the occurrences of matched working sets for the keyword within each identified source code file, wherein the instructions to determine the score that depends on the occurrences of matched working sets for the keyword within each identified source code file further cause the at least one processor to:

for each identified source code file, multiply, by the scoring engine, each identified working set type identified within the source code file by a predetermined value; and sum, by the scoring engine, the scores of each working set type identified within the source code file to generate the score for the source code file;

for each directory or repository, determine, by the scoring engine, an aggregated score for all the source code files comprised within; and present, by a presentation engine, a listing of all identified source code files by directory and repository, wherein the listing illustrates a relevancy of repositories, directories, and source code files that comprise the keyword associated with the task.

14. The data processing system of claim 13, wherein the relevancy is based on the determined score for the source code file and the aggregated score for the directory or repository.

15. The data processing system of claim 13, wherein the presentation uses an indication of relevancy when presenting the repositories, directories, and source code files.

16. The data processing system of claim 15, wherein the indication of relevancy is the determined score or determined aggregated score or is a color difference.

17. The data processing system of claim 13, wherein the instructions to determine the aggregated score for all the source code files comprised within a particular directory or a particular repository further cause the at least one processor to:

compute, by the scoring engine, the aggregated score using the following equation:

$$\mathrm{sqrt(score1*score1+score2*score2+\ldots+score(n)*score(n))}$$

wherein score1, score2, ..., score (n) are the scores associated with the source code files comprised within the particular directory or repository.

* * * * *